(12) United States Patent
Sengupta et al.

(10) Patent No.: US 9,406,980 B2
(45) Date of Patent: Aug. 2, 2016

(54) SYSTEM AND METHOD OF MITIGATING HIGH-TEMPERATURE, HIGH-CHARGE GAS SWELLING OF BATTERY OF PORTABLE ELECTRONIC DEVICE

(71) Applicant: BLACKBERRY LIMITED, Waterloo (CA)

(72) Inventors: Surajit Sengupta, Cambridge (CA); Yu William Feng, Waterloo (CA); Jonathan Quinn Brubacher, Waterloo (CA); Joseph Patino, Miramar, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/034,673

(22) Filed: Sep. 24, 2013

(65) Prior Publication Data

US 2015/0084600 A1 Mar. 26, 2015

(51) Int. Cl.
*H01M 10/44* (2006.01)
*H01M 10/42* (2006.01)
*H01M 10/48* (2006.01)
*H02J 7/00* (2006.01)

(52) U.S. Cl.
CPC ........ *H01M 10/443* (2013.01); *H01M 10/4257* (2013.01); *H01M 10/445* (2013.01); *H01M 10/446* (2013.01); *H01M 10/48* (2013.01); *H01M 10/486* (2013.01); *H01M 2010/4271* (2013.01); *H01M 2220/30* (2013.01); *H02J 7/0075* (2013.01); *H02J 7/0091* (2013.01)

(58) Field of Classification Search
CPC .................. H01M 10/443; H01M 10/4257

USPC ............ 320/107, 116, 132; 524/435; 429/185
See application file for complete search history.

(56) References Cited

U.S. PATENT DOCUMENTS 5,459,391 A * 10/1995 Amano ................. H02J 7/0091
320/152
7,489,106 B1 * 2/2009 Tikhonov .............. H02J 7/0018
320/116
7,695,867 B2 4/2010 Chang
(Continued)

FOREIGN PATENT DOCUMENTS

WO 2010030894 A1 3/2010

OTHER PUBLICATIONS

European Partial Search Report; Application No. 14186121.1; Mar. 26, 2015; 8 pages.

(Continued)

*Primary Examiner* — Edward Tso
*Assistant Examiner* — Dung V Bui
(74) *Attorney, Agent, or Firm* — Conley Rose, P.C.; J. Robert Brown, Jr.

(57) ABSTRACT

A method mitigates or even prevents gas swelling of a battery of a portable electronic device at high temperatures and states of charge of the battery. The method comprises: receiving "temperature" and "state of charge" signals, which are functions of a temperature and state of charge of the battery, respectively; determining, as corresponding functions of the "temperature" and "state of charge" signals, whether the temperature is within an elevated operating-temperature range and the state of charge is within an elevated state-of-charge range; cycle-forming the battery a predetermined number of cycles; and terminating the "cycle-forming" operation of the battery when the pre-determined number of cycles is reached.

22 Claims, 4 Drawing Sheets

(56) References Cited

U.S. PATENT DOCUMENTS

| | | |
|---|---|---|
| 2001/0031397 A1 | 10/2001 | Kweon |
| 2003/0157411 A1 | 8/2003 | Jung et al. |
| 2005/0208380 A1 | 9/2005 | Park |
| 2005/0234177 A1* | 10/2005 | Zaghib ............ C08F 283/00 524/435 |
| 2006/0194103 A1* | 8/2006 | Otohata ............ H01G 9/016 429/185 |
| 2006/0226812 A1 | 10/2006 | Patino |
| 2007/0139008 A1 | 6/2007 | Sterz |
| 2009/0061325 A1 | 3/2009 | Odani |
| 2010/0019727 A1* | 1/2010 | Karden ............ B60L 11/1861 320/129 |
| 2010/0024204 A1 | 2/2010 | Min et al. |
| 2011/0043169 A1* | 2/2011 | Sengupta ............ H02J 7/0081 320/132 |
| 2011/0093223 A1* | 4/2011 | Quet ............ H01M 8/04656 702/60 |
| 2011/0156641 A1* | 6/2011 | Kishiyama ............ H02J 7/0073 320/109 |
| 2012/0025771 A1 | 2/2012 | Bhardwaj |
| 2013/0049702 A1* | 2/2013 | Dai ............ H02J 7/041 320/150 |
| 2014/0340023 A1* | 11/2014 | Shu ............ H02J 7/0018 320/107 |
| 2014/0369512 A1 | 12/2014 | Slupeiks et al. |
| 2015/0084600 A1* | 3/2015 | Sengupta et al. ............ 320/132 |

OTHER PUBLICATIONS

Canadian Office Action; Application No. 2,865,654; May 22, 2015; 4 pages.
European Extended Search Report; Application No. 14186121.1; Jul. 14, 2015; 18 pages.
Canadian Office Action; Application No. 2,865,654; Feb. 26, 2016; 5 pages.

* cited by examiner

SYSTEM AND METHOD OF MITIGATING HIGH-TEMPERATURE, HIGH-CHARGE GAS SWELLING OF BATTERY OF PORTABLE ELECTRONIC DEVICE

BACKGROUND

A user of a portable electronic device (PED) can often expose the device to high or elevated temperatures. For example, during a hot summer day, the user may leave the PED on a dashboard of a vehicle and leave the vehicle parked outside for an extended period of time. As such, the temperature inside the vehicle and, in turn, of the PED may be elevated due to a "greenhouse" or other effect.

BRIEF DESCRIPTION OF DRAWING

For a more complete understanding of this disclosure, reference is now made to the following brief description, taken in connection with the accompanying drawing and detailed description, wherein like reference numerals represent like parts.

DETAILED DESCRIPTION

Figure 1:
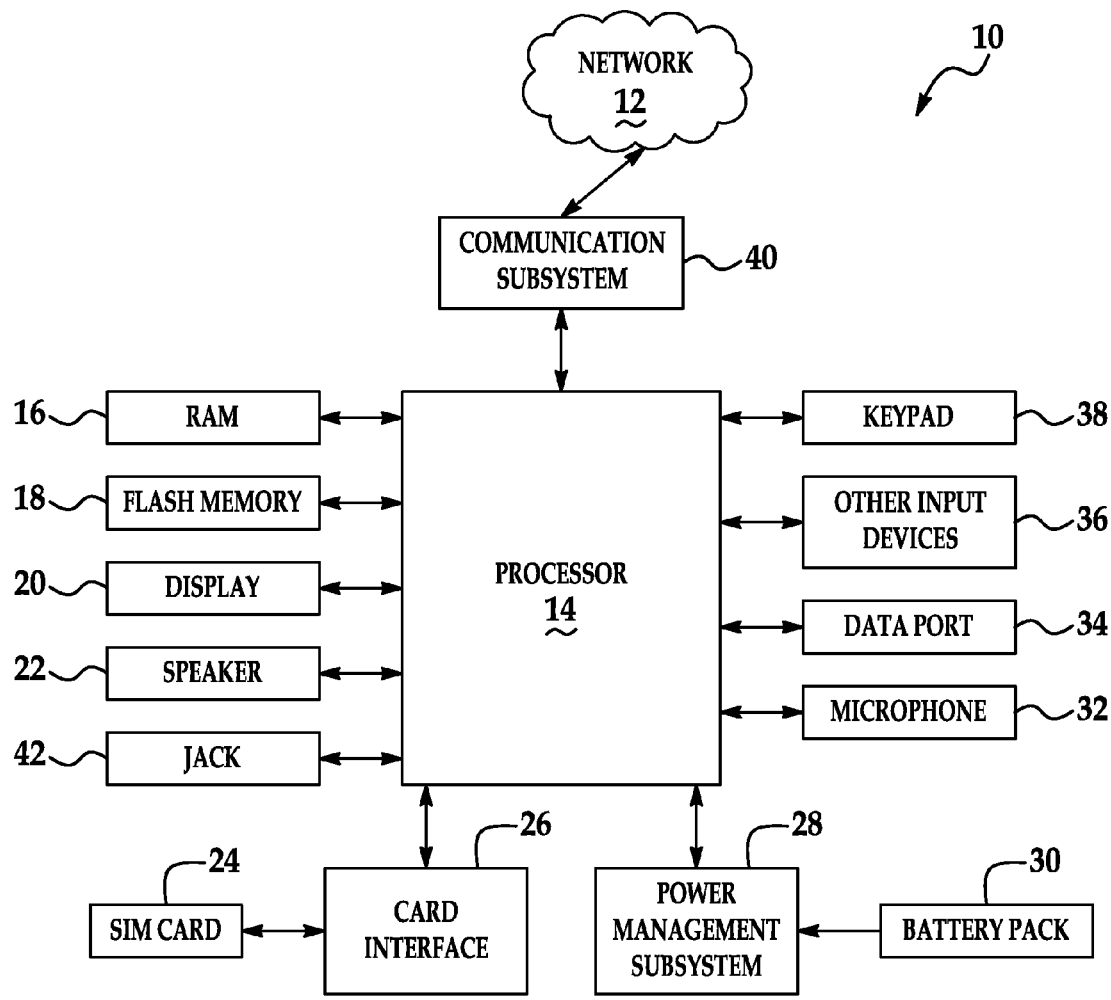
FIG. 1 is a block diagram of a portable electronic device (PED) according to an embodiment.

A lithium polymer battery is typically used as a non-removable battery or embedded battery of a PED. The battery consists of volatile material that, under certain conditions, allows for generation of gas within the battery, which results in gas swelling of the battery. Abnormal gas swelling is exacerbated by two primary factors—elevated temperature and amount of charge of the battery. In particular, when the PED is stored at conditions of high temperature (such as due to the "greenhouse" or other effect described above) and high state of charge of the PED, a rate of decomposition of chemicals within the battery is increased, thereby breaking down electrolytes thereof. In fact, it has been observed that the gas swelling increases exponentially with an increase in percentage of the state of charge. (Test data has shown that swelling within the same period of time is considerably higher when the battery is stored at a maximum state of charge than when the battery is stored at lower states of charge.) In this regard, it has been found that, when the PED is charged to a high state, gas within a fresh battery of this type and, thus, the battery itself can swell about thirty percent while the PED is stored at an elevated temperature of more than 50° C. (thermistors disposed within the PED detect the temperature.)

A gap is designed in the PED to account for the solid swelling of the battery. In other words, a typical PED may incorporate some empty space within its body to accommodate expansion of the battery, but it may be undesirable for the battery to swell beyond the limits of the accommodation. Solid swelling results from normal use and cycling of the battery, and it is typically less than ten percent after more than fifty cycles of use. In known PEDs, the gap is designed to account for swelling of only about eight percent. Therefore, swelling of a high percentage is not being accounted for in the known PEDs. Build-up of swelling of the gas within a limited amount of space defined by the gap can be undesirable. More specifically, such build-up can lead to a broken pouch of the battery, or may adversely affect the body or structure of the PED and may contribute to one or more hazards.

It has been observed also that the gas swelling is more likely to occur during a period of time from when the battery is fresh to when it has undergone about five cycles of use or "forming" cycles (a single "forming" cycle being defined as a state of charge of the PED starting from a substantially "minimum" level, increasing to a substantially "maximum" level, and returning to the substantially "minimum" level). After this period, the risk of the gas swelling is diminished within a reasonable high-temperature range [at 110° C. or 130° C. (gas swelling occurs even if cycled)].

However, although a manufacturer of the PED can determine the state of charge of the PED, the manufacturer cannot control the temperature at which the battery is stored. The battery is typically supplied to a manufacturer of the PED without the PED ever having undergone any "forming" cycles. And, the manufacturer has no control over use of the PED by the user and cannot urge or require the user to use the PED only at or about room temperature for the first few cycles. Consequently, the gas swelling is especially possible during these first few cycles, which raises the risk of an undesirable degree of swelling.

Described below are systems and methods by which gas swelling can be controlled or reduced, especially swelling that may be related to high temperatures and high states of charge of the battery.

It should be understood at the outset that although illustrative implementations of at least one embodiment of the present disclosure are provided below, the disclosed systems and/or methods may be implemented using any number of techniques, whether currently known or in existence. The disclosure should in no way be limited to the illustrative implementations, drawing, and techniques illustrated below, including the exemplary designs and implementations illustrated and described herein, but may be modified within the scope of the appended claims along with their full scope of equivalents.

Referring now to FIG. 1, a portable electronic device (PED) 10 according to an embodiment is generally indicated at 10. The concepts described in further detail below may be applied with a variety of devices, and the concepts are not restricted to application with the illustrative PED 10. The PED 10 includes data-communication capabilities and may communicate with other electronic devices directly or through a wireless network. The PED 10 is based upon a computing environment and functionality of a handheld computer, such as a wireless personal digital assistant (PDA). It should be appreciated, however, that the PED 10 is not limited to a wireless PDA and other PEDs—such as (but limited to) cellular telephones, smart telephones, electronic messaging devices, and laptop computers—are possible.

The PED 10 includes several components, including a processor 14, which controls overall operation of the PED 10. Although depicted for simplicity as a single unit, the processor 14 can be embodied as a plurality of processors 14, each processor 14 controlling (or participating in control of) at least one operation of the PED 10. A communication sub-system 40 controls data and voice-communication functions—such as e-mail, PIN (Personal Identification Number) message, SMS (Short Message Service) message, and cellular-telephone functions. The communication sub-system 40 is in communication with a wireless network 12, which may be a data-centric wireless network, a voice-centric wireless network, or a dual-mode wireless network.

In FIG. 1, the communication sub-system 40 is a dual-mode wireless network that supports both voice and data communications. The communication sub-system 40 is configured in accordance with the "Global System for Mobile Communication" (GSMC) and "General Packet Radio Services" (GPRS) standards. The communication sub-system 40 may be configured alternatively in accordance with "Enhanced Data GSM Environment" (EDGE) or "Universal Mobile Telecommunications Service" (UMTS) standards. Other wireless networks may also be associated with the PED 10, including "Code Division Multiple Access" (CDMA) or "CDMA2000" networks. Examples of data-centric networks include "WiFi 802.11," "Mobitex™" and "DataTAC™" communication systems. Examples of voice-centric networks include "Personal Communication Systems (PCS)" networks like "GSM" and "Time Division Multiple Access (TDMA)" communication systems.

The wireless network 12 includes base stations (not shown) that provide a wireless link to the PED 10. Each base station defines a cell that, in turn, defines a coverage area within which communications between the base station and PED 10 can be effected. It should be appreciated that the PED 10 is movable within the cell and can be moved to respective coverage areas defined by other cells. Data is delivered to the PED 10 via wireless transmission from the base station. Similarly, data is sent from the PED 10 via wireless transmission to the base station.

The communication sub-system 40 further includes a "short-range communications" function, which enables the device 10 to communicate directly with other devices and computer systems without use of the wireless network 12 through, for example, infrared or "Bluetooth™" technology.

Prior to the PED 10 being able to send and receive communication signals over the wireless network 12, network registration or activation procedures must have been completed. To enable network communication, an "SIM (Subscriber Identity Module)" card 24 is inserted into a card interface 26. The "SIM" card (or "Removable User Identity Module" card) is used to identify a user of the mobile device, store personal-device settings, and enable access to network services (such as e-mail and voicemail) and is not bound to a particular PED 10.

The processor 14 is also connected to a random-access memory (RAM) 16 and flash memory 18. An operating system and a device software are typically stored in the flash memory 18 and executable by the processor 14. Some components of the device software may, in turn, be stored in the RAM 16. The PED 10 includes computer-executable programmed instructions for directing the PED 10 to implement various applications. Some examples of applications that may be stored on and executed by the PED 10 include electronic messaging, games, a calendar, an address book, and a music player. Software applications that control basic operation of the PED 10, such as voice and data communication, are typically installed during manufacture of the PED 10. For a PED 10 that does not include an "SIM" card 24, user-identification information may be programmed into the flash memory 18. The flash memory 18 may alternatively be a persistent storage, a read-only memory (ROM), or other non-volatile storage.

The processor 14 receives input from a keypad 38 and other various input devices 36. The keypad 38 may be completely alphanumeric or of a "telephone" type. The other input devices 36 may replace or complement the keypad 38 to facilitate input and include devices such as single or multi-function buttons and a touch screen, mouse, trackball, capacitive touch sensor, or roller wheel with dynamic button-pressing capability. The PED 10 of FIG. 1 is shown by way of example, and it should be appreciated that many different types, shapes, and input-device configurations of the PED 10 are possible.

The processor 14 outputs to various output devices, such as a display 20. In an embodiment, the display 20 is an LCD screen 20. A microphone 32 and speaker 22 are connected to the processor 14 for cellular-telephone functions. A data port 34 is connected to the processor 14 for enabling data communication between the PED 10 and another computing device. The data port 34 may include data lines for data transfer and a supply line for charging a rechargeable lithium-polymer battery, cell, or battery pack 30 of the PED 10. The battery pack 30 or a component thereof may not be removed from the PED 10 and is, therefore, a non-removable battery or embedded battery. A power-management sub-system 28 may be electrically coupled to the battery pack 30 and provide an interface between an auxiliary charging device and the battery pack 30. The power-management sub-system 28 may perform any of several functions pertaining to power management, including controlling recharging of the battery pack 30 or regulating power delivery to other components in the PED 10. Some of these functions 28 are discussed below.

It should be appreciated that the battery pack 30 or a component thereof may be removed from the PED 10. It should be appreciated also that the battery pack 30 may include a housing (not shown). The battery pack 30 stores energy chemically, but it should be appreciated also that such chemistry is not necessarily limited to a particular type and includes that which is capable of high-temperature, high-charge gas swelling. Other types may include, for example, nickel-cadmium, nickel-metal-hydride, and silver- or zinc-based.

It should be appreciated also that the battery pack 30 may include any power pack that has at least one energy-storage element and is capable of high-temperature, high-charge gas swelling. It should be appreciated also that such power pack may include a housing for the energy-storage element. It should be appreciated also that the power pack may, in addition to or alternatively, include a fuel cell that uses hydrogen (from hydrides), methanol, ethanol, or butane as fuel.

The PED 10 is operable in "data communication" and "voice communication" modes. In the "data communication" mode, a received data signal representing information (such as a text message, an e-mail message, a media file to be transferred, or a webpage download) is processed by the communication sub-system 40 and input to the processor 14. The processor 14 further processes the signal and renders images for display on the display screen 20. Alternatively, the processed signals may be output to another computing device through the data port 34. To transmit information in the "data communication" mode, the user of the PED 10 composes information for transmission (such as e-mail messages) using the keypad 38 and other input devices 36 in conjunction with the display screen 20. The composed information is transmitted through the communication sub-system 40 over the wireless network 12 or via short-range communications. Operation of the PED 10 in the "voice communication" mode is similar to that of the "data communication" mode except that the received signals are output to the speaker 22 or an auxiliary device (such as a headset or headphones) and signals for transmission are generated by the microphone 32. The PED 10 may also include other voice sub-systems, such as a voice-message-recording sub-system. An audio jack 42 is provided for receiving an audio accessory, such as headphones, a headset, or amplified speakers or headphones. The audio jack 42 may also receive other accessories, such as a multi-media accessory including "Play," "Pause," "Stop," and "Rewind" buttons or a "TV Out" accessory that allows for connection of the PED 10 to a television.

Components and sub-systems such as those shown in FIG. 1 may be housed, partly or completely, in a body 43 that may (for example) protect the components, give a desirable appearance, and give the PED 10 some structural integrity. Only a limited number of sub-systems of the PED 10 have been described. It should be appreciated that additional sub-systems corresponding to additional features of the PED 10 may also be connected to the processor 14.

Figure 2:
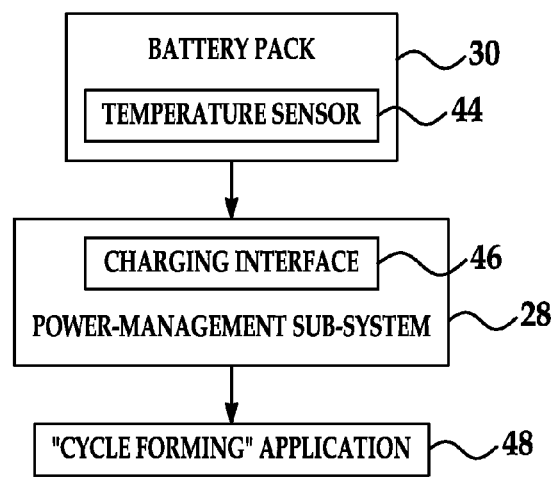
FIG. 2 is a block diagram that includes a "cycle-forming" application of a battery or battery pack of the PED of FIG. 1.

Referring to FIG. 2, the power-management sub-system 28, which regulates and distributes power throughout the PED 10, includes a charging interface 46 for communicating with the battery pack 30. The power-management sub-system 28 may operate under direction of the processor 14. In a typical implementation, the power-management sub-system 28 includes at least one integrated circuit. The power-management sub-system 28 may operate under the control of the processor 14 when the processor 14 executes a "cycle-forming" application 48, which is stored on the PED 10 (e.g., in the flash memory 18) and executable by the processor 14. (A single "forming" cycle is defined as a state of charge of the PED 10 starting from a substantially "minimum" level, increasing to a substantially "maximum" level, and returning to the substantially "minimum" level).

A temperature sensor 44 is coupled to the battery pack 30 to sense a temperature of the battery pack 30. For simplicity, a single temperature sensor 44 is depicted in FIG. 2, but the concept may be adapted to a plurality of temperature sensors 44. As used herein, "couple" refers to a physical relation of two components with each other such that a condition of one component affects function of the other. In the case of the temperature sensor 44 and battery pack 30, the components may be physically coupled to each other in that they are proximate to one another such that the temperature sensor 44 can sense a temperature of the battery pack 30. The temperature sensor 44 may be physically close to the battery pack 30, abutting the battery pack 30, or a component of the battery pack 30 (such as affixed to or embedded in a housing of the battery pack 30). The temperature sensor 44 may be electrically coupled to one or more components. For example, the temperature sensor 44 may be electrically coupled to the processor 14 by supplying or providing a "temperature" indication in the form of an electrical signal (a "temperature" signal), which is received by the processor 14.

As used herein, "electrical coupling" refers to a relation of two components with each other such that one component can communicate with the other by way of an electrical signal. The electrical signal may be an essentially continuous signal (such as a modulated voltage or current signal) or discrete signal (such as an "on/off" or "high/low" voltage or current signal). The electrical signal may also include delivery of power. Two components may be electrically coupled to one another even if they are not connected directly to one another and even if the electrical signal passes through at least one intermediary element. The temperature sensor 44 may be coupled electrically to the processor 14 without necessarily being physically close to or abutting the processor 14.

The temperature sensor 44 senses a temperature of the battery pack 30 by receiving as input a sensed temperature of the battery pack 30 and issuing as output a "temperature" signal. The "temperature" signal is generally a function of the temperature of the battery pack 30. The "temperature" signal may (but need not) be an electrical signal that changes as a function of the sensed temperature of the battery pack 30. In some embodiments, there may be a range of "temperature" signals. In other embodiments, the "temperature" signal may be a simple logical signal that, for example, goes high when the sensed temperature is in a high or an elevated operating-temperature range and otherwise low. The "temperature" signal may also be represented as a signal that represents a numerical value. The "temperature" signal may then be received by the processor 14, which determines whether the temperature is within the elevated operating-temperature range as a function of the "temperature" signal. As discussed below, this determination may affect an "active discharging" application 72, which may control the power-management sub-system 28.

In one embodiment, the temperature sensor 44 is a thermistor. Other suitable temperature sensors 44 may alternatively be used (for example, a thermocouple or CMOS on-chip temperature sensor). The temperature sensor 44 may be deployed anywhere on, in, or proximate to the battery pack 30 (including, but not limited to, places in the battery pack 30 that tend to be hotter or cooler than other places during use or recharging of the PED 10). In some embodiments, the temperature sensor 44 may be a component of the battery pack 30 such that removal of the battery pack 30 or a component thereof disengages the temperature sensor 44 from the PED 10. In other embodiments, the temperature sensor 44 remains coupled to other components in the PED 10. In other words, the temperature sensor 44 may be coupled to a non-removable component of the PED 10 (including, but not limited to, a non-removable component of the battery pack 30 such that removal of the battery pack 30 or a component thereof does not disengage the temperature sensor 44 from the PED 10).

Cycle-forming of the battery pack 30 may be performed at normal operating temperatures and states of charge of the battery pack 30. In an embodiment, the cycle-forming is performed during a first night of use of the PED 10 and in "room temperature" conditions. If "high temperature" and "high SOC" conditions are detected, then it is too late to perform the cycle-forming.

In contrast, the power-management sub-system 28 may actively discharge the battery pack 30 when the battery pack 30 is above the normal operating temperature and within an elevated operating-temperature range and the state of charge of the battery pack 30 is above the normal state of charge and within an elevated range. Generally speaking, active discharge is when charging is actively terminated. In a typical implementation, for example, a battery of the battery pack 30 may be charged substantially continuously until full charge is reached and actively discharged substantially continuously until zero charge is reached. At any point, charging may be stopped.

It should be appreciated that the power-management sub-system 28 may still increase or maintain an amount of charge when the battery pack 30 is above the normal operating temperature and within an elevated operating-temperature range and the state of charge of the battery pack 30 is above the normal state of charge and within an elevated range. It should be appreciated also that the battery pack 30 can be charged and actively discharged in any suitable manner involving charge current and charge-termination voltage of the battery pack 30.

The processor 14 receives also a "state of charge" indication in the form of an electrical signal. The "state of charge" signal is generally a function of the state of charge of the battery pack 30 and may (but need not) be an electrical signal that changes as a function of the state of charge of the battery pack 30. In some embodiments, there may be a range of "state of charge" signals. In other embodiments, the "state of charge" signal may be a simple logical signal that, for example, goes high when the state of charge is in an elevated range and otherwise low. The "state of charge" signal may then be received by the processor 14, which determines whether the state of charge is within the elevated range as a function of the "state of charge" signal. As used herein, being "within a state-of-charge range" includes, but is not limited to, these concepts. Being "within a state-of-charge range" generally refers to meeting or satisfying a criterion or criteria related to particular state of charge or range of state of charge, and being within an "elevated state-of-charge range" generally refers to being in a state-of-charge range that indicates or corresponds to an elevated state of charge. As discussed below, this determination may affect the "active discharging" application 72, which may control the power-management sub-system 28.

What constitutes an elevated operating temperature or state of charge may be defined differently for different circumstances. Stated another way, what constitutes an elevated operating temperature or state of charge for one battery pack 30 might not constitute an elevated operating temperature or state of charge for another battery pack 30. An elevated operating-temperature range may be defined as 40° C. and higher (104° F. and higher), and an elevated state of charge may be defined as below, but approaching, eighty percent. A range of elevated temperatures and states of charge may also be defined that are extra-elevated. For example, an extra-elevated temperature range may be defined as 60° C. and higher (140° F. and higher), and an extra-elevated state of charge may be defined as ninety to one-hundred percent. Control of active discharging may be changed if sensed temperatures and states of charge reach the extra-elevated temperature range and state of charge. Charging may be terminated entirely when sensed temperatures reach the extra-elevated temperature range.

Figure 3:
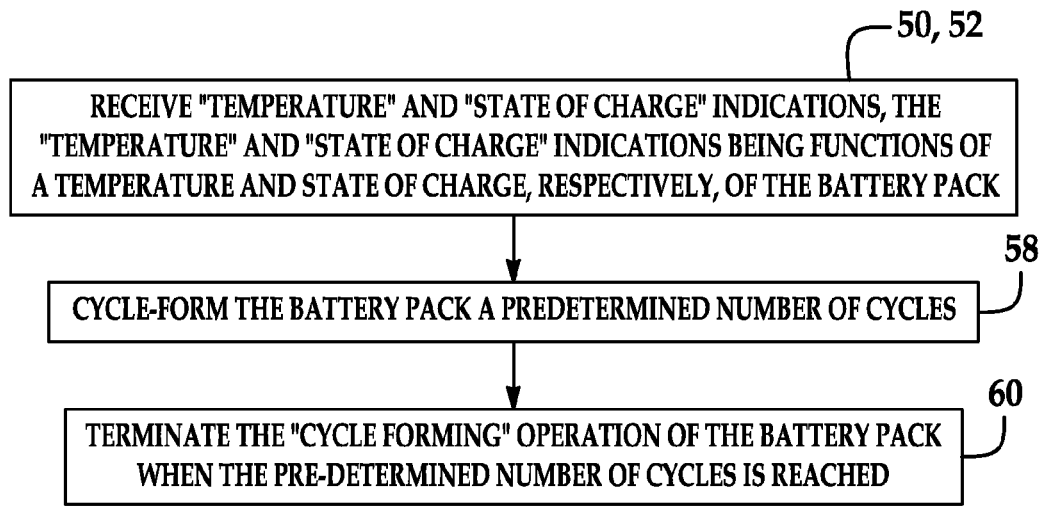
FIG. 3 is a flow diagram that illustrates a method of cycle-forming the battery pack of the PED of FIG. 1 according to an embodiment.

In operation, the battery pack 30 is electrically coupled to an auxiliary charging device and receives power therefrom. Referring to FIGS. 2 and 3, an embodiment of the following method is executed while the battery pack 30 is being charged. Although described as being carried out by the processor 14, the embodiment may be carried out by a plurality of processors 14 in the PED 10. The embodiment includes, at steps 50, 52, the processor 14 receiving a "temperature" signal as a function of the temperature of the battery pack 30 and a "state of charge" signal as a function of the state of charge of the battery pack 30. At step 58, the processor 14 cycle-forms the battery pack 30 a predetermined number of cycles.

The number of cycles is predetermined in the sense that it is settled upon, determined, constrained or otherwise made reasonably definite, expressly or impliedly, at some time before the cycle-forming is carried out. At step 60, the processor 14 terminates the "cycle-forming" operation of the battery pack 30 when the pre-determined number of cycle-forms is reached. The processor 14 may control the power-management sub-system 28 to terminate the "cycle-forming" operation.

The embodiment of FIGS. 2 and 3 may be embodied as computer-readable instructions, such as instructions included in the "cycle-forming" application 48. The "cycle-forming" application may be stored in the flash memory 18 or another computer-readable medium of the PED 10 and is executable by the processor 14. The "cycle-forming" application 48 may control the power-management sub-system 28 to carry out the operations illustrated in FIGS. 2 and 3.

In an embodiment, the predetermined number of cycles is between about one and about four "0.7 C Charge" and "1 C Discharge." (The "C" rate is a theoretical amount of current that the battery pack 30 can deliver to discharge one-hundred percent within one hour. In general, the maximum charging current may not be able to reach 1 C because it is limited by the auxiliary charging device. A typical auxiliary charging device imposes a 700 mA maximum on the charging current. However, different auxiliary charging devices may impose higher or lower limits). Also in the embodiment, the elevated operating-temperature range is about 80° C. to 90° C., and the elevated range of the state of charge is about ninety percent to about one-hundred percent.

Figure 4:
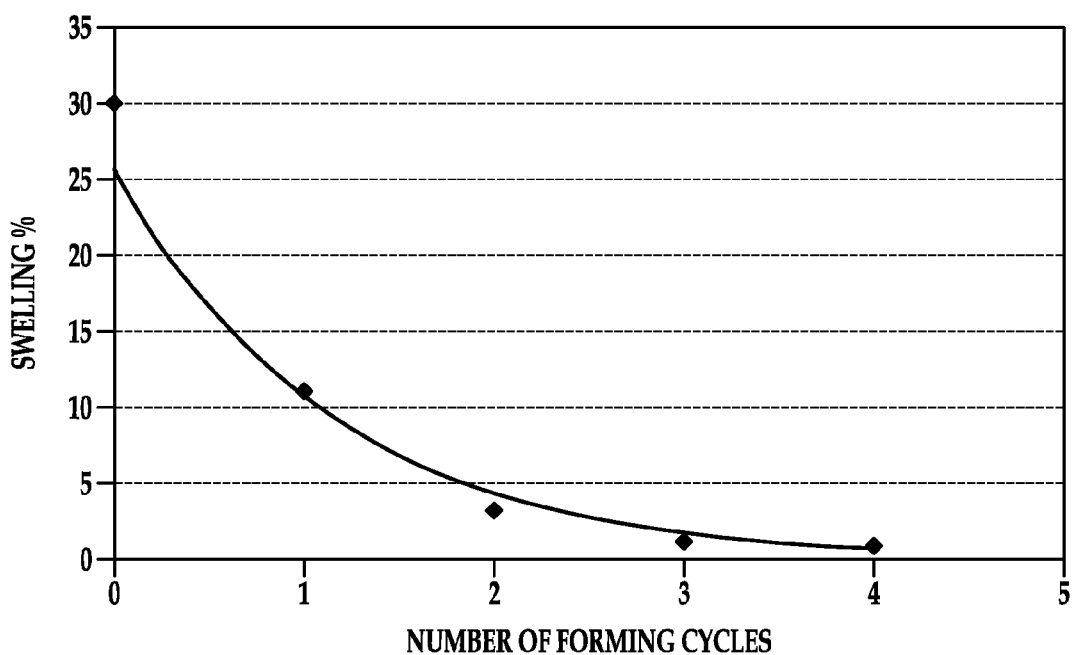
FIG. 4 is a graph that illustrates a relationship between a number of "forming" cycles and percentage of gas swelling of the battery pack of the PED of FIG. 1 according to the embodiment of the method of FIG. 3, wherein the battery pack was stored at a predetermined high or elevated temperature for a predetermined amount of time and was at a predetermined voltage and state of charge of one-hundred percent.

In FIG. 4, a graph shows a relationship between the number of "forming" cycles and percentage of swelling of the battery pack 30 of the PED 10. In this case, the battery pack 30 was stored at 85° C. for four hours, was at 4.35 V and a state of charge of one-hundred percent, and underwent four "0.7 C Charge" and "1 C Discharge" "forming" cycles. From the figure, it is observed that the battery pack 30 showed a decrease in the percentage of gas swelling over the number of "forming" cycles. More specifically, it is observed that gas swelling below about five percent can be obtained if the battery pack 30 is cycle-formed at least twice.

Figure 5:
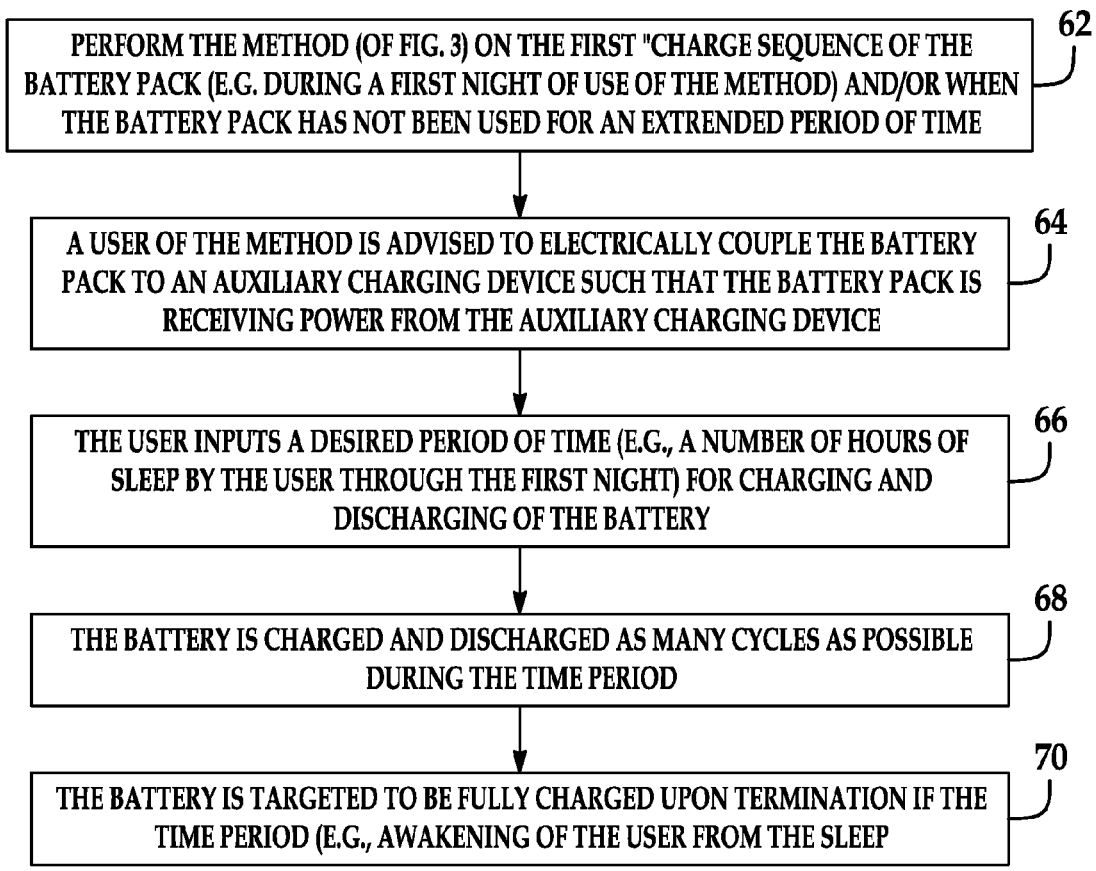
FIG. 5 is a flow diagram that illustrates implementation by the PED of FIG. 1 of a "'smart' charge/discharge" sequence to complete a "forming" process of the battery pack of the PED and mitigate or even prevent a possibility of gas swelling at high temperatures and state of charge of the battery pack.

Furthermore and as shown in FIG. 5, in another embodiment of the method of FIG. 3, the PED 10 can implement a "'smart' charge/discharge" sequence to complete the "forming" process of the battery pack 30 and mitigate or even prevent a possibility of gas swelling at high temperatures and state of charge. More specifically, at step 62, the method is performed on a first "charge" sequence of the battery pack 30 (e.g. during a first night of use of the PED 10 by the user) and/or when the battery pack 30 has not been used for an extended period of time (e.g., a few days, weeks, months, etc.). At step 64, the PED 10 advises the user of the PED 10 to electrically couple the battery pack 30 to the auxiliary charging device such that the battery pack 10 is receiving power therefrom. At step 66, the user inputs into the PED 10 a period of time (e.g., number of hours of sleep) for charging and discharging of the battery. At step 68, the PED 10 charges and discharges the battery pack 30 as many cycles as possible during that time period. At step 70, the PED 10 targets to have the battery pack 30 fully charged upon termination of the time period (e.g., the user awakening from the sleep).

It should be appreciated that the battery pack 30 can be stored at any suitable elevated temperature for any suitable period of time, at any suitable voltage and elevated state of charge, and undergo any suitable number of "forming" cycles.

Figure 6:
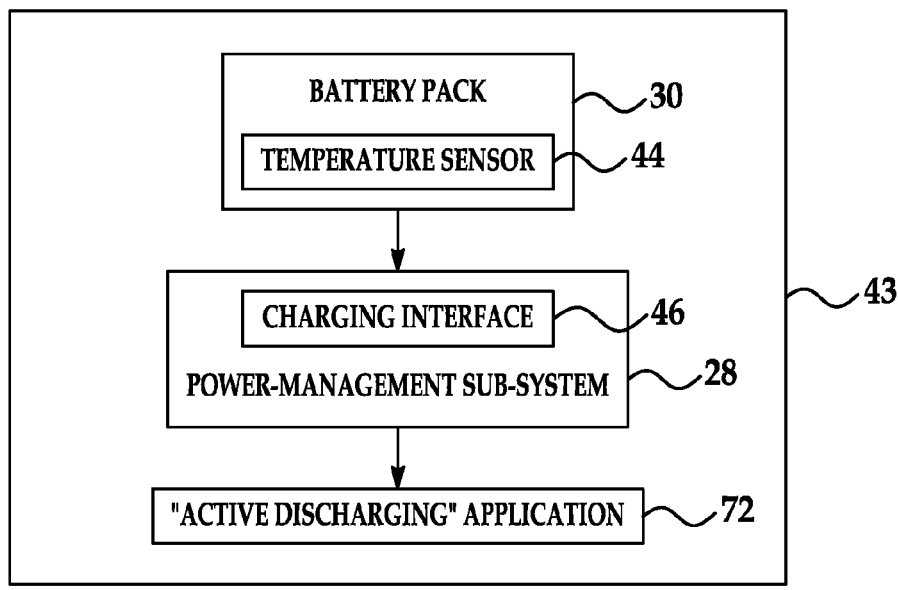
FIG. 6 is a block diagram that includes an "active discharging" application of a battery pack of the PED of FIG. 1.
Figure 7:
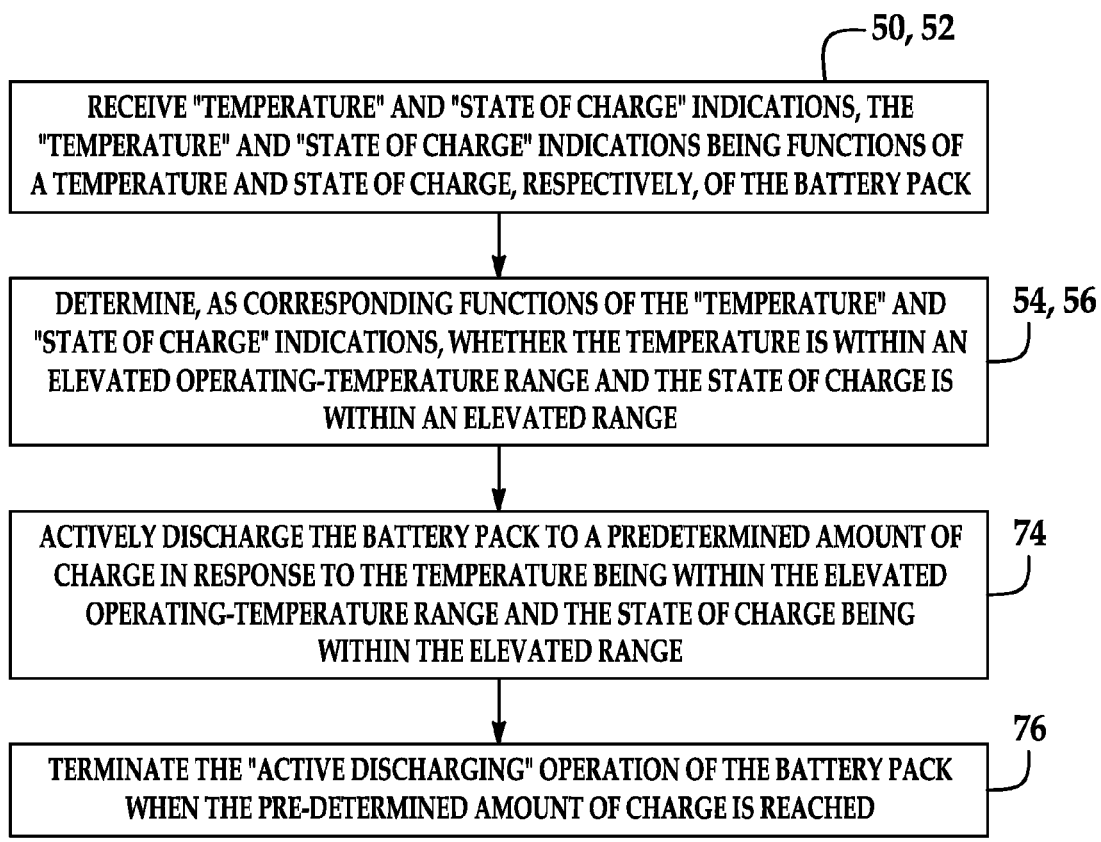
FIG. 7 is a flow diagram that illustrates a method of actively discharging the battery pack of the PED of FIG. 1 according to an embodiment.

Referring now to FIGS. 6 and 7, another embodiment of the method is executed also while the battery pack 30 is being charged. Again, although described as being carried out by the processor 14, the embodiment may be carried out by a plurality of processors 14 in the PED 10. The embodiment includes, at steps 50, 52, the processor 14 receiving a "temperature" signal as a function of the temperature of the battery pack 30 and a "state of charge" signal as a function of the state of charge of the battery pack 30. At steps 54, 56, the processor 14, which executes the "active discharging" application 72 and may control the power-management sub-system 28, determines, as corresponding functions of the "temperature" and "state of charge" signals, whether the temperature is within an elevated operating-temperature range and the state of charge is within an elevated range. At step 74, the processor 14 actively discharges the battery pack 30 to a predetermined amount of charge in response to the temperature being within the elevated operating-temperature range and the state of charge being within the elevated range. At step 76, the processor 14 terminates the "active discharging" operation of the battery pack 30 when the pre-determined amount of charge is reached. The processor 14 may control the power-management sub-system 28 to terminate the "active discharging" operation.

In the embodiment, the active discharge is carried out by the PED 10 running an application or a task on the processor 14 so that the state of charge of the battery pack 30 is maintained at or below a certain level. Some examples of such application that may be carried out by the processor 14 include electronic messaging, games, a calendar, an address book, and a music player. It should be appreciated, however, that the application can be any suitable application. It should be appreciated also that the active discharge can be carried out in any suitable manner.

Similar to the embodiment of FIGS. 2 and 3, the embodiment of FIGS. 6 and 7 may be embodied as computer-readable instructions. In an embodiment, the elevated operating-temperature range is about 80° C. to 90° C.

Figure 8:
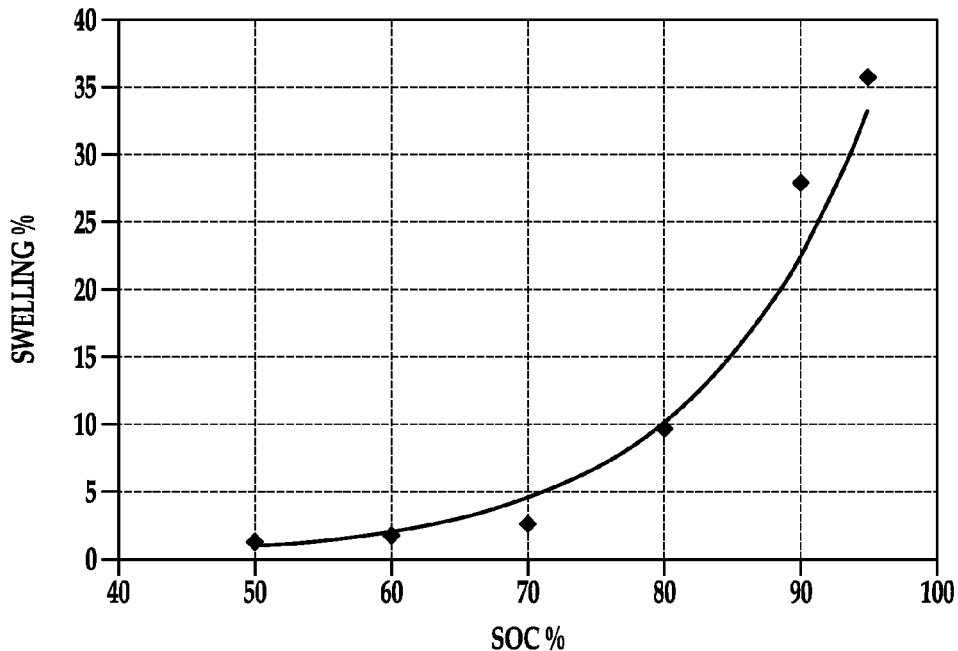
FIG. 8 is a graph that illustrates a relationship between a percentage of state of charge and percentage of swelling of a fresh (without "forming" cycles) battery pack of a PED according to the embodiment of the method of FIG. 6, wherein the battery pack was charged at various percentages of states of charge and stored at a predetermined elevated temperature for a predetermined amount of time.

In FIG. 8, a graph shows a relationship between a percentage of state of charge and percentage of swelling of a fresh (without "forming" cycles) battery pack 30 of the PED 10. In this case, the battery pack 30 was charged at various percentages of states of charge and stored at 85° C. for four hours. From the figure, it is observed that the gas swelling increases exponentially with an increase in the percentage of the state of charge. More specifically, it is observed that the battery pack 30 should be kept charged at about seventy percent or below to avoid risk of the gas swelling. Generally, mitigation or even prevention of swelling of this type is required only when the battery pack 30 is fresh to its having undergone about five "forming" cycles. After then, as discussed above, the risk of the gas swelling is diminished at a reasonable high-temperature range.

It should be appreciated that the battery pack 30 can be charged at any suitable various percentages of states of charge, stored at any suitable elevated temperature for any suitable period of time, and undergo any suitable number of "forming" cycles.

The embodiments account for a high percentage of gas swelling of the battery pack 30 in the PED 10. More specifically, the embodiments mitigate or even prevent such swelling at high temperatures and high states of charge of the battery pack 30 [and not merely reduce the swelling after the fact (i.e., after the swelling is detected)].

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated with another system, or certain features may be omitted or not implemented.

Also, techniques, systems, sub-systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating with each other through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of mitigating gas swelling of a battery of a portable electronic device comprising:
   receiving a "temperature" signal that is a function of a temperature of the battery;
   receiving a "state of charge" signal that is a function of a state of charge of the battery;
   determining whether the temperature is within an elevated operating-temperature range;
   determining whether the state of charge is within an elevated state-of-charge range in response to determining that the temperature is within the elevated operating-temperature range;
   responsive to determining that the temperature is within the elevated operating-temperature range and the state of charge of the battery is within the elevated state-of-charge range, cycle-forming the battery a predetermined number of cycles to mitigate gas swelling of the battery;
   terminating the "cycle-forming" operation of the battery when the pre-determined number of cycles is reached; and
   maintaining the state of charge at or below a normal state of charge so long as the temperature is within or above the elevated operating-temperature range, the normal state of charge being about seventy percent and the elevated operating-temperature range being about 80° C. to 90° C.

2. The method of claim 1, wherein the predetermined number of cycles is between about one and about four "0.7 C Charge" and "1 C Discharge".

3. The method of claim 1, wherein receiving the "temperature" signal includes receiving the "temperature" signal from a temperature sensor coupled to the battery.

4. The method of claim 1, further comprising preventing the battery from exceeding the normal state of charge when the temperature is within or above the elevated operating-temperature range.

5. The method of claim 1, further comprising:
   responsive to determining that the battery's state of charge is within the elevated state of charge range, automatically terminating charging the battery if the battery's temperature exceeds 80° C., wherein the elevated state-of-charge range is about ninety percent to about one-hundred percent; and
   maintaining the battery at or below the normal state of charge so long as the temperature is at or above 80° C.

6. The method of claim 1, wherein the battery is a lithium-polymer battery, the lithium-polymer battery being one of a removable battery or a non-removable battery embedded in the portable electronic device.

7. The method of claim 1, wherein a voltage of the battery is about 4.35 V.

8. The method of claim 1, wherein the method is performed at least one of on a first "charge" sequence of the battery and when the battery has not been used for an extended period of time lasting at least three consecutive days, a user of the personal electronic device is advised to electrically couple the battery to an auxiliary charging device such that the battery is receiving power from the auxiliary charging device, the user inputs a desired period of time for cycle-forming the battery, the battery is charged and discharged as many cycles as possible during the time period, and the battery is targeted to be fully charged upon termination of the time period.

9. The method of claim 8, wherein the first "charge" sequence of the battery substantially coincides with a first night of use of the personal electronic device by the user, the desired time period substantially coincides with a number of hours of sleep by the user through the first night, and the termination of the time period substantially coincides with awakening of the user from the sleep.

10. The method of claim 8, wherein each cycle of cycle-forming the battery comprises charging the battery:
   starting from a substantially "minimum" state of charge;
   increasing to a substantially "maximum" state of charge; and
   returning to the substantially "minimum" state of charge.

11. The method of claim 1, further comprising, when five or less cycle-forming operations have been performed on the battery since being installed on the portable electronic device, preventing the battery's state of charge from exceeding 70% when the battery's temperature exceeds 50° C.

12. A portable electronic device comprising:
   a processor electrically coupled to a temperature sensor;
   a battery electrically coupled to the processor and temperature sensor; and
   a power-management sub-system controlled by the processor,
   wherein, to mitigate gas swelling of the battery, the processor:
      receives a "temperature" signal that is a function of a temperature of the battery and a "state of charge" signal that is a function of a state of charge of the battery;
      determines whether the temperature is within an elevated operating-temperature range and whether the state of charge is within an elevated state-of-charge range;
      controls the power-management sub-system to cycle-form the battery a predetermined number of cycles in response to determining that the temperature is within the elevated operating-temperature range and the state of charge is within the elevated state-of-charge range;
      terminates the "cycle-forming" operation of the battery when the pre-determined number of cycles is reached; and
      maintains the state of charge at or below a normal state of charge so long as the temperature is within or above the elevated operating-temperature range, the normal state of charge being about seventy percent and the elevated operating-temperature range being about 80° C. to 90° C.

13. The portable electronic device of claim 12, wherein the portable electronic device comprises further the temperature sensor.

14. A computer-readable medium having computer-readable instructions stored on the computer-readable medium for execution of the computer-readable instructions by a processor to mitigate gas swelling of a battery of a portable electronic device by:
   receiving a "temperature" signal that is a function of a temperature of the battery;
   receiving a "state of charge" signal that is a function of a state of charge of the battery;
   determining whether the temperature is within an elevated operating-temperature range;
   determining whether the state of charge is within an elevated state-of-charge range in response to determining that the temperature is within the elevated operating-temperature range;
   responsive to determining that the temperature is within the elevated operating-temperature range and the state of charge of the battery is within the elevated state-of-charge range, cycle-forming the battery a predetermined number of cycles to mitigate gas swelling of the battery;
   terminating the "cycle-forming" operation of the battery when the pre-determined number of cycles is reached; and
   maintaining the state of charge at or below a normal state of charge so long as the temperature is within or above the elevated operating-temperature range, the normal state of charge being about seventy percent and the elevated operating-temperature range being about 80° C. to 90° C.

15. A method of mitigating gas swelling of a battery of a portable electronic device comprising:
   receiving a "temperature" signal that is a function of a temperature of the battery;
   receiving a "state of charge" signal that is a function of a state of charge of the battery;
   determining whether the temperature is within an elevated operating-temperature range;
   determining whether the state of charge is within an elevated state-of-charge range in response to determining that the temperature is within the elevated operating-temperature range;
   mitigating gas swelling of the battery by actively discharging the battery to a predetermined amount of charge in response to the temperature being within the elevated operating-temperature range and the state of charge being within the elevated state-of-charge range;
   terminating the "active discharging" operation of the battery when the pre-determined amount of charge is reached; and
   maintaining the state of charge at or below a normal state of charge so long as the temperature is within or above the elevated operating-temperature range, the normal state of charge being about seventy percent and the elevated operating-temperature range being about 80° C. to 90° C.

16. The method of claim 15, wherein actively discharging the battery to the predetermined amount is carried out by an application running on the portable electronic device, and wherein the normal state of charge is no greater than about seventy percent.

17. The method of claim 15, wherein receiving the "temperature" signal includes receiving the "temperature" signal from a temperature sensor coupled to the battery.

18. The method of claim 15, wherein the elevated operating-temperature range is about 80° C.

19. The method of claim 15, wherein the battery is a lithium-polymer battery, the lithium-polymer battery being one of a removable battery or a non-removable battery embedded in the portable electronic device.

20. A portable electronic device comprising:
a processor electrically coupled to a temperature sensor;
a battery electrically coupled to the processor and temperature sensor; and
a power-management sub-system controlled by the processor, wherein, to mitigate gas swelling of the battery, the processor:
receives a "temperature" signal that is a function of a temperature of the battery and a "state of charge" signal that is a function of a state of charge of the battery;
determines whether the temperature is within an elevated operating-temperature range and whether the state of charge is within an elevated state-of-charge range;
controls the power-management sub-system to actively discharge the battery to a predetermined amount of charge in response to the temperature being within the elevated operating-temperature range and the state of charge being within the elevated state-of-charge range;
terminates the "active discharging" operation of the battery when the pre-determined amount of charge is reached; and
maintains the state of charge at or below a normal state of charge so long as the temperature is within or above the elevated operating-temperature range, the normal state of charge being about seventy percent and the elevated operating-temperature range being about 80° C. to 90° C.

21. The portable electronic device of claim 20, wherein the portable electronic device comprises further the temperature sensor.

22. A computer-readable medium having computer-readable instructions stored on the computer-readable medium for execution of the computer-readable instructions by a processor to mitigate gas swelling of a battery of a portable electronic device by:
receiving a "temperature" signal that is a function of a temperature of the battery;
receiving a "state of charge" signal that is a function of a state of charge of the battery;
determining whether the temperature is within an elevated operating-temperature range;
determining whether the state of charge is within an elevated state-of-charge range in response to determining that the temperature is within the elevated operating-temperature range;
mitigating gas swelling of the battery by actively discharging the battery to a predetermined amount of charge in response to the temperature being within the elevated operating-temperature range and the state of charge being within the elevated state-of-charge range;
terminating the "active discharging" operation of the battery when the pre-determined amount of charge is reached; and
maintaining the state of charge at or below a normal state of charge so long as the temperature is within or above the elevated operating-temperature range, the normal state of charge being about seventy percent and the elevated operating-temperature range being about 80° C. to 90° C.

* * * * *